(12) United States Patent
Pöllmann et al.

(10) Patent No.: US 6,391,923 B1
(45) Date of Patent: May 21, 2002

(54) AQUEOUS POLYMER DISPERSION, ITS PREPARATION AND USE

(75) Inventors: Klaus Pöllmann, Burghausen; Hendrik Ahrens, Osnabrück; Achim Stankowiak, Altötting, all of (DE)

(73) Assignee: Clariant GmbH, Frankfurt (DE)

( * ) Notice: Subject to any disclaimer, the term of this patent is extended or adjusted under 35 U.S.C. 154(b) by 104 days.

(21) Appl. No.: 09/615,422

(22) Filed: Jul. 13, 2000

(30) Foreign Application Priority Data

Jul. 13, 1999 (DE) ......................................... 199 32 572
Aug. 19, 1999 (DE) ......................................... 199 39 266

(51) Int. Cl.[7] ................................................. C08J 3/32
(52) U.S. Cl. .................... 514/714; 524/755; 526/310; 526/312; 526/332; 526/333
(58) Field of Search ................................ 526/332, 333, 526/312, 310; 524/714, 755

(56) References Cited

U.S. PATENT DOCUMENTS 5,798,425 A * 8/1998 Albrecht et al. ............. 526/271

FOREIGN PATENT DOCUMENTS

| EP | 0 736 553 | 10/1996 |
|---|---|---|
| EP | 0 870 784 | 10/1998 |
| JP | 5-209052 | 8/1993 |

OTHER PUBLICATIONS

W.P. J. Bailey in Chemistry and Technology of water soluble Polymers, Plenum Press, 1983, p. 261–265.

* cited by examiner

*Primary Examiner*—David W. Wu
*Assistant Examiner*—William K. Cheung
(74) *Attorney, Agent, or Firm*—Richard P. Silverman

(57) ABSTRACT

The present invention relates to aqueous dispersions preparable by polymerization of an olefinically unsaturated, water-insoluble compound in the presence of a water-soluble allyl or vinyl ether of the formula 1

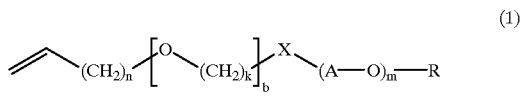

(1)

in which b is 0 or 1 n is 0 or 1 k is an integer from 1 to 20,

X is O or $N[(A-O)_m-R]$

A is $C_2-C_4$-alkylene m is an integer from 5 to 900, and

R is H or $C_1-C_4$-alkyl, and in which A is not exclusively $C_3$- or $C_4$-alkylene, by mixing the olefinically unsaturated water-insoluble compound with the water-soluble allyl and vinyl ether in water, and triggering the polymerization by a free-radical initiator.

9 Claims, No Drawings

AQUEOUS POLYMER DISPERSION, ITS PREPARATION AND USE

BACKGROUND OF THE INVENTION

The present invention relates to polymer dispersions which can be prepared using polymerizable polyalkylene glycol macromonomers.

The polymeric emulsifiers and protective colloids used for very diverse applications are generally ambivalent copolymers which contain both hydrophobic and hydrophilic comonomer fractions. A typical example is the partially hydrolyzed polyvinyl acetate used in the suspension polymerization of, for example, styrene, disclosed, for example, in W. P. J. Bailey in Chemistry and Technology of water-soluble Polymers, Plenum Press, 1983 page 261 et seq., ISBN 0306-41251-9, which adsorbs via the nonhydrolyzed fractions of vinyl acetate to the emulsified styrene droplets and, via the hydrophilic fractions of polyvinyl alcohol, ensures emulsification of these droplets in the aqueous suspension. Copolymers of acrylic acid and hydrophobic acrylic and methacrylic esters, such as, for example, dodecyl methacrylate, which are used in the cosmetics sector to formulate and stabilize aqueous lotions and emulsions of water-insoluble oils (lit: BF Goodrich product information "Pemulen Emulsifiers" 1995), or acrylic copolymers, which are used to stabilize aqueous dispersions of silicates, gypsum, talc, clay and other minerals in the exploration of petroleum and formulation of building materials (EP-A-0 870784), act in a similar way.

DESCRIPTION OF THE RELATED ART

JP-A-5-209 052 discloses copolymers of vinyl chloride with vinyl polyether macromonomers which are produced in the form of solid products. A dispersing action of the vinyl polyether macromonomers is not disclosed.

EP-A-0 736 553 discloses copolymers of carboxylic acids or derivatives thereof and propoxylated vinyl ethers, but these too do not form a dispersion.

SUMMARY OF THE INVENTION

The object of the present invention was to find a process with which copolymers can be directly obtained as aqueous dispersions.

The present invention describes a class of water-dispersed copolymers which can be prepared by copolymerizing allyl or vinyl polyethers with known, mostly hydrophobic monomers. The copolymers can be used without a diluent for the emulsification/dispersion, or, depending on the process and intended use, such as, for example, in the case of emulsion polymerization, can be prepared in situ by adding small amounts of the polymerizable macromonomers.

DESCRIPTION OF THE PREFERRED EMBODIMENTS

The invention thus provides aqueous dispersions preparable by polymerization of an olefinically unsaturated, water-insoluble compound in the presence of a water-soluble allyl or vinyl ether of the formula 1

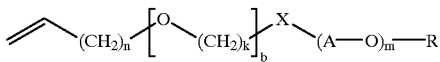
(1)

in which
b is 0 or 1
n is 0 or 1
k is an integer from 1 to 20,
X is O or N[(A—O)$_m$—R]
A is C$_2$–C$_4$-alkylene
m is an integer from 5 to 900, and
R is H or C$_1$–C$_4$-alkyl,
and in which A is not exclusively C$_3$- or C$_4$-alkylene, by mixing the olefinically unsaturated water-insoluble compound with the water-soluble allyl or vinyl ether in water, and triggering the polymerization by a free-radical initiator.

k preferably assumes values from 2 to 12, in particular 4 to 8. X is preferably oxygen. R is preferably hydrogen. In a further preferred embodiment n=1, b=0 and X=O.

In the alkoxy chain given by (A—O)$_m$, A is preferably an ethylene or propylene radical, in particular an ethylene radical. The total number of alkoxy units is preferably between 8 and 240, in particular between 16 and 115. The alkoxy chain can be a block polymer chain which has alternating blocks of different alkoxy units, preferably ethoxy and propoxy units. It can also be a chain with alkoxy units in random sequence.

In a preferred embodiment, —(A—O)$_m$— is an alkoxy chain of the formula

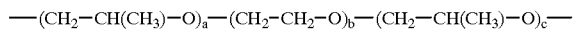

in which
a is a number from 0 to 300, preferably 1 to 80, in particular 2 to 35
b is a number from 5 to 300, preferably 8 to 80, in particular 10 to 45
c is a number from 0 to 300, preferably 8 to 80, in particular 8 to 35.

In a further preferred embodiment, —(A—O)$_m$— is an ethoxy radical having from 8 to 240 ethoxy units.

A common feature of all of the embodiments is that preferably at least 50 mol % of the radicals (A—O) are ethoxy radicals, in particular 60 to 90 mol % are ethoxy radicals. The number of propoxy and butoxy radicals is, in a preferred embodiment, at most so great that the cloud point of the compound of the formula 1 in water is still at 30° C. or above.

If X is N[(A—O)$_m$—R], then the compounds of the formula 1 have the following structure:

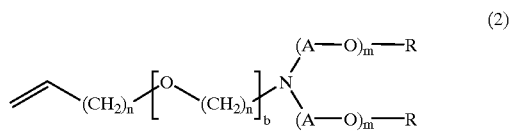
(2)

The compounds of the formula 2, in which k, A, m, n, b and R are as defined above, are also provided by the invention.

The invention further provides compounds of the formula 1 in which X=O and R=C$_1$–C$_4$-alkyl. Preferably, in such compounds n=0.

The compounds of the formula 1 are also referred to below as polymerizable macromonomers.

The preparation of the polymerizable macromonomers, and illustrative applications of the dispersions according to the invention are described in more detail below and illustrated by reference to examples.

The polymerizable macromonomers are prepared by anion/alkali initiated polymerization of hydroxy- or amino-functional allyl or vinyl ethers (ethers which still have at least one active hydrogen atom) with alkylene oxide or mixtures of alkylene oxides in random distribution or as block copolymers. Furthermore, the resulting macromonomers can also be etherified at the terminal hydroxyl groups by means of a Williamson synthesis. The hydroxy- or amino-functional allyl or vinyl ethers have formula 3

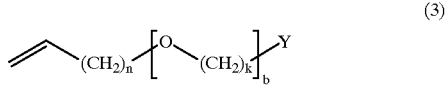

(3)

where Y=OH, $NH_2$.

The degree of water solubility, defined by the cloud point, of the polymerizable macromonomers, and the extent of their hydrophilicizing and dispersing action can be set by the ratio and number of alkylene oxide units, preferably of ethylene oxide to propylene oxide, and through the choice of the hydroxy- or amino-functional allyl or vinyl ether.

The free-radical initiated copolymerization of the polymerizable macromonomers with olefinically unsaturated water-insoluble monomers produces the copolymer dispersions according to the invention. Suitable water-insoluble monomers which can be polymerized with the macromonomers are, for example, the following:

vinyl monomers, such as carboxylic esters of vinyl alcohol, for example vinyl acetate, vinyl propionate, vinyl ether of isononanoic acid or of isodecanoic acid, styrene and stilbene, olefinically unsaturated carboxylic esters, such as ethyl acrylate, n-butyl acrylate, i-butyl acrylate, hexyl acrylate, 2-ethylhexyl acrylate, hydroxyethyl acrylate, and the corresponding methacrylic esters, olefinically unsaturated carboxylic acids, such as acrylic acid, methacrylic acid and itaconic acid and their sodium, potassium and ammonium salts, olefinically unsaturated sulfonic acids and phosphonic acids and their alkali metal and ammonium salts, such as acrylamidomethylpropanesulfonic acid (AMPS) and its alkali metal and ammonium, alkylammonium and hydroxyalkylammonium salts, allylsulfonic acid and its alkali metal and ammonium salts, acryloyloxethylphosphonic acid and its ammonium and alkali metal salts, and the corresponding methacrylic acid derivatives, olefinically unsaturated amines, ammonium salts, nitriles and amides, such as dimethylaminoethyl acrylate, acryloyloxethyltrimethylammonium halides, acrylonitrile, N-methacrylamide, N-ethylacrylamide, N-propylacrylamide, and the corresponding methacrylic acid derivatives and vinylmethylacetamide, olefins, such as ethylene, propene and butenes, pentene, 3-butadiene and chloroprene, vinyl halides, such as vinyl chloride, vinylidene chloride and vinylidene fluoride.

The present invention further relates to the use of the above-defined macromonomers of the formula 1 in emulsion polymerizations or suspension polymerizations.

The invention further provides for the use of the polymerizable polyalkylene macromonomers according to the invention as emulsifiers or dispersants.

The compounds of the formula 1 can be used in suspension or emulsion polymerizations alone as emulsifiers, and also in a mixture with anionic and/or nonionic surfactants known in the prior art.

Customary anionic surfactants are sodium alkyl sulfate, sodium dodecylbenzenesulfonate, sodium alkylsulfonate, sodium and ammonium alkylpolyethylene glycol ether sulfates, sodium and ammonium alkylphenol polyethylene glycol ether sulfates, and alkylpolyethylene glycol ether phosphoric mono-, di- and triesters and mixtures thereof, and alkylphenol polyethylene glycol ether phosphoric mono-, di- and triesters and mixtures thereof.

EXAMPLES

The examples below illustrate the invention in more detail.

Example 1

50.5 g of 4-hydroxybutyl vinyl ether were adjusted to a pH of 14 using 0.2 mol $NaOCH_3$ solution, and reacted with 440 g of ethylene oxide at superatmospheric pressure at 140° C. for 8 h. The resulting product (macromonomer) was completely water-soluble, i.e. the cloud point of the macromonomer in water is above 100° C. The OH number is 62.8 mg/KOH/g, corresponding to a molecular weight of 894 g/mol. This corresponds to a polyethylene oxide monobutyl vinyl ether having 18 units of ethylene oxide per vinyl ether unit. Using $^1$H-NMR and by determining the iodine number (21 g/100 g) it was possible to detect the total receipt of vinyl units (polymerizable units) per molecule.

Example 2

50.5 g of 4-hydroxybutyl vinyl ether were adjusted to a pH of 14 using 0.2 mol $NaOCH_3$ solution and firstly reacted with 145 g of propylene oxide at superatmospheric pressure at 140° C. for 6 h. 440 g of ethylene oxide were added to the reaction product, and the mixture was likewise reacted at superatmospheric pressure at 140° C. for 8 h. The resulting product (macromonomer) was still completely water-soluble at room temperature, exhibited a cloud point in water of 64.4°0 C. and had surfactant, emulsifying properties. The OH number was 50.9 mg/KOH/g, corresponding to a molecular weight of 1100 g/mol. This corresponds to a polyethylene oxide-polypropylene oxide block copolymer monobutyl vinyl ether having 18 units of ethylene oxide and 4 units of propylene oxide per vinyl ether unit. Using $^1$H-NMR and by determining the iodine number (21 g/100 g) it was possible to detect the total receipt of vinyl units (polymerizable units) per molecule.

Example 3

50.5 g of diethylene glycol monovinyl ether were adjusted to a pH of 14 using 0.2 mol $NaOCH_3$ solution, and reacted with 440 g of ethylene oxide at superatmospheric pressure at 140° C. for 8 h. The resulting product (macromonomer) was completely water-soluble, i.e. the cloud point of the macromonomer in water is above 100° C.

Example 4

50.5 g of aminopropyl vinyl ether were, adjusted to a pH of 14 using 0.1 mol $NaOCH_3$ solution, and reacted with 440 g of ethylene oxide at superatmospheric pressure at 140° C.

for 8 h. The resulting product (macromonomer) was completely water-soluble, i.e. the cloud point of the macromonomer in water is above 100° C.

Example 5

49.5 g of diethylene glycol monovinyl ether were adjusted to a pH of 14 using 0.1 mol $NaOCH_3$ solution, and reacted with 800 g of ethylene oxide at superatmospheric pressure at 140° C. for 10 h. The resulting product (macromonomer) was completely water-soluble, i.e. the cloud point was above 100° C. The OH number was 28 mg/KOH/g, corresponding to a molecular weight of 2000 g/mol. Using $^1$H-NMR and by determining the iodine number (10 g/100 g) it was possible to detect the total receipt of vinyl units (polymerizable units) per molecule.

Example 6

The macromonomer from Example 1 is copolymerized with AMPS.

Example 7

The macromonomer from Example 2 is used as coemulsifier in the emulsion polymerization of vinyl acetate and vinyl isodecanoate. The copolymer of vinyl acetate and vinyl isodecanoate and the macromonomer from Example 2 which forms in situ has good emulsion-stabilizing properties because of its ambivalent structure.

360 ml of water are charged to a glass flask, and 6 g of ®Emulsogen EPA 073 (alkyl ether sulfate), 24 g of ®Tylose H 200 YG4 (hydroxyethylcellulose), 6 g of borax, 2.6 g of acetic acid (99% strength) and 92 g of a 1.17% strength potassium peroxodisulfate solution and 170 g of a monomer emulsion, which consists of 480 g of water, 6 g of Emulsogen EPA 073, 17 g of Emulsogen EPN 287 (alkyl ethoxylate), 30 g of the macromonomer from, Example 2, 300 g of vinyl isodecanoate and 900 g of vinyl acetate, are added. The mixture is then heated up to 76° C. and, after the reaction has started at 80° C., the remaining monomer emulsion and a further 210 g of a 1.17% strength ,potassium peroxodisulfate solution are metered in over 3 hours. The mixture is then stirred for 2 hours for after polymerization at 80° C. and cooled to room temperature. During the cooling phase, 3 g of preservative (200 Mergal K9N) are added.

Example 8

The macromonomer from Example 2 is used as coemulsifier in the emulsion polymerization of n-butyl acrylate, methyl methacrylate and methacrylic acid. The copolymer of n-butyl acrylate, methyl methacrylate and methacrylic acid and the macromonomer from Example 2 which forms in situ has good emulsion-stabilizing properties on the basis of its ambivalent structure.

520 ml of water are charged to a glass flask, and 16 g of ®Emulsogen EPA 1954 (sodium alkyl sulfate), 15 g of a 3.75% strength ammonium peroxodisulfate solution, 11.8 g of n-butyl acrylate, 11.8 g of methyl methacrylate and 0.48 g of methacrylic acid are added, and the mixture is stirred. The emulsion is heated to 80° C. with stirring and a monomer emulsion, which consists of 475 ml of water, 16 g of Emulsogen EPA 1954, 4.8 g of the macromonomer from Example 2, 440 g of n-butyl acrylate, 440 g of methyl methacrylate, 8.8 g of methacrylic acid and 2.85 g of ammonium peroxodisulfate is metered in over 4 hours. When all of the monomer emulsion has been metered in and following an afterpolymerization of one hour at 80° C., the polymer dispersion is cooled to room temperature and adjusted to pH 8–9 using ammonia solution.

Example 9

The macromonomer consisting of a block polymer of allyl alcohol, Which has been reacted firstly with 5 mol of propylene oxide and then with 30 mol of ethylene oxide, is used as coemulsifier in the emulsion polymerization of n-butyl acrylate, methyl methacrylate and methacrylic acid. The copolymer of n-butyl acrylate, methyl methacrylate and methacrylic acid and the described allyl alkoxide which forms in situ has good emulsion-stabilizing properties on the basis of its ambivalent structure.

520 ml of water are charged to a glass flask, and 16 g of ®Emulsogen EPA 1954 (sodium alkyl sulfate), 15 g of a 3.75% strength ammonium peroxodisulfate solution, 11.8 g of n-butyl acrylate, 11.8 g of methyl methacrylate and 0.48 g of methacrylic acid are added, and the mixture is stirred. The emulsion is heated to 80° C. with stirring, and a monomer emulsion which consists of 460 ml of water, 32 g of Emulsogen EPA 1954, 4.8 g of the described allyl alkoxylate, 440 g of n-butyl acrylate, 440 g of methyl methacrylate, 8.8 g of methacrylic acid and 2.85 g of ammonium peroxodisulfate, is metered in over 4 hours. When all of the monomer emulsion has been metered in and following an afterpolymerization of one hour at 80° C., the polymer dispersion is cooled to room temperature and adjusted to pH 8–9 using ammonia solution.

Example 10

To 100 g of the product from Example 1 are added, under nitrogen, firstly 10 g of solid NaOH, and then 14 g of n-butyl chloride are metered in. The reaction vessel is stirred at superatmospheric pressure for 5 hours at 80° C. The vessel is then evacuated and heated under reduced pressure to 120° C. and stirred for a further 3 hours.

After the reaction mixture has cooled, it is repeatedly stirred with 500 ml of water and left to stand to enable the phases to separate. The aqueous sodium-chloride-containing phase is discarded in each case. The upper phase (yield: 94 g/88%) is, according to $^1$H-NMR, iodine number determination (24 g/100 g) and OH number measurement (5 mg/g), finally the mono-n-butylpolyethylene glycol mono-4-hydroxyvinyl ether having 18 units of ethylene oxide.

Example 11

To 100 g of the product from Example 1 are added, under nitrogen in an autoclave, firstly 10 g of solid NaOH, and then 7 g of methyl chloride are metered in under superatmospheric pressure. The reaction vessel is stirred at superatmospheric pressure for 5 hours at 80° C. The vessel is then evacuated and heated under reduced pressure to 120° C. and stirred for a further 3 hours.

After the reaction mixture has cooled, it is repeatedly stirred with 500 ml of water and left to stand to enable the phases to separate. The aqueous sodium-chloride-containing phase is discarded in each case. The upper phase (yield: 92 g/90%) is, according to $^1$H-NMR, iodine number determination (26 g/100 g) and OH number measurement (5 mg/g), finally the mono-methyl polyethylene glycol mono4-hydroxyvinyl ether having 18 units of ethylene oxide.

What is claimed is:

1. An aqueous dispersion preparable by polymerization of an olefinically unsaturated, water-insoluble compound in the presence of a water-soluble allyl, or vinyl ether of the formula 1

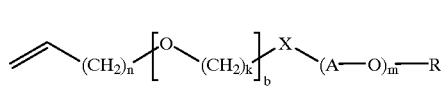 (1)

in which
- b is 0 or 1
- n is 0 or 1
- k is an integer from 1 to 20,
- X is O or $N[(A-O)_m-R]$
- A is $C_2$–$C_4$-alkylene
- m is an integer from 5 to 900, and
- R is H or $C_1$–$C_4$-alkyl,
- and in which A is not exclusively $C_3$- or $C_4$-alkylene, by mixing the olefinically unsaturated water-insoluble compound with the water-soluble allyl or vinyl ether in water, and triggering the polymerization by a free-radical initiator.

2. The aqueous dispersion as claimed in claim 1, in which k is a number from 4 to 8.

3. The aqueous dispersion as claimed in claim 1, in which X is oxygen.

4. The aqueous dispersion as claimed in claim 1, in which R is hydrogen.

5. The aqueous dispersion as claimed in claim 1, in which A is ethylene or propylene.

6. The aqueous dispersion as claimed in claim 1, in which $-(A-O)_m-$ is an alkylene oxide block polymer of the formula

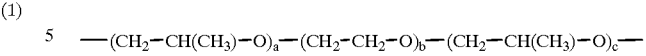

in which

- a is a number from 0 to 300,
- b is a number from 5 to 300,
- c is a number from 0 to 300.

7. The aqueous dispersion as claimed in claim 1, in which $-(A-O)_m-$ is an ethoxy chain having from 8 to 240 ethoxy units.

8. The aqueous dispersion as claimed in claim 6, wherein

- a is a number from 1 to 80,
- b is a number from 8 to 80, and
- c is a number from 1 to 80.

9. The aqueous dispersion as claimed in claim 6, wherein

- a is a number from 2 to 35,
- b is a number from 10 to 45, and
- c is a number from 8 to 35.

* * * * *